(12) United States Patent
Hsu

(10) Patent No.: US 8,214,593 B2
(45) Date of Patent: Jul. 3, 2012

(54) SERIAL INTERFACE CACHE CONTROLLER INCLUDING COMPARISON CONTROL UNIT AND FINITE STATE MACHINE, CONTROL METHOD AND MICRO-CONTROLLER SYSTEM USING THE SAME

(75) Inventor: Han-Huah Hsu, Hisn Chu (TW)

(73) Assignee: Sunplus Innovation Technology Inc., Hsinchu Science Park (TW)

( * ) Notice: Subject to any disclaimer, the term of this patent is extended or adjusted under 35 U.S.C. 154(b) by 337 days.

(21) Appl. No.: 12/620,987

(22) Filed: Nov. 18, 2009

(65) Prior Publication Data

US 2010/0131711 A1    May 27, 2010

(30) Foreign Application Priority Data

Nov. 21, 2008   (TW) .............................. 97145031 A

(51) Int. Cl.
*G06F 13/00* (2006.01)
(52) U.S. Cl. ......... 711/118; 711/133; 711/144; 711/145
(58) Field of Classification Search .................. 711/18, 711/133, 144, 145, 118
See application file for complete search history.

(56) References Cited

U.S. PATENT DOCUMENTS

| 4,996,641 | A | * | 2/1991 | Talgam et al. | 711/118 |
| 5,778,427 | A | * | 7/1998 | Hagersten et al. | 711/128 |
| 5,848,283 | A | * | 12/1998 | Moore et al. | 712/40 |
| 6,449,694 | B1 | * | 9/2002 | Burgess et al. | 711/128 |
| 6,516,387 | B1 | * | 2/2003 | Auracher | 711/123 |
| 7,380,065 | B2 | * | 5/2008 | Davis et al. | 711/134 |

* cited by examiner

*Primary Examiner* — Hong Kim
(74) *Attorney, Agent, or Firm* — Muncy, Geissler, Olds & Lowe, PLLC

(57) ABSTRACT

A serial interface cache controller, control method and micro-controller system using the same. The controller includes L rows of address tags, wherein each row of address tags includes an M-bits block tag and an N-bits valid area tag. The M-bits block tag records an address block of T-byte data stored in an internal cache memory, and the N-bits valid area tag records valid bit sectors in the address block. Each valid bit sector has the size of T/N bytes. The controller needs to read T/N bytes of data from an external memory to the internal cache memory at each time without the need of reading the T-byte data of the whole address block. Because the T-byte data of the whole address block is not necessary to be read by the micro-controller, the waiting time of the micro-controller may be shortened, and the performance can be increased.

15 Claims, 6 Drawing Sheets

SERIAL INTERFACE CACHE CONTROLLER INCLUDING COMPARISON CONTROL UNIT AND FINITE STATE MACHINE, CONTROL METHOD AND MICRO-CONTROLLER SYSTEM USING THE SAME

This application claims priority of Ser. No. 097145031 filed in Taiwan R.O.C. on Nov. 21, 2008 under 35 USC 119, the entire content of which is hereby incorporated by reference.

BACKGROUND OF THE INVENTION

1. Field of the Invention

The invention relates to a serial interface cache controller, and more particularly to a cache controller capable of decreasing the data quantity read from an external memory so that a serial interface bandwidth of a cache memory may be reduced.

2. Related Art

FIG. 1 shows the architecture of a typical micro-control system 10 for accessing data from an external memory in parallel. Referring to FIG. 1, the micro-control system 10 includes a micro-controller 11 connected to an external memory 12. The external memory 12 may be a flash memory or any other memory capable of storing data. The micro-control system 10 accesses the data in the external memory 12 in parallel. The micro-control system 10 needs to have many pads for an address bus, a data bus and the like. Consequently, the micro-control system 10 has the higher access speed, and the chip area has to be enlarged for the pads so that the low-cost requirement cannot be satisfied.

FIG. 2 shows the architecture of a typical micro-control system 20 for serially accessing data from an external memory. Referring to FIG. 2, the micro-control system 20 includes a micro-controller 11, an internal memory 21 and a serial interface read controller 22. The micro-control system 20 is connected to an external memory 23. Because the micro-control system 20 serially reads the data from the external memory 23, many pads may be saved, and the pad cost and the chip area may be reduced. Before the micro-control system 20 starts to operate, the serial interface read controller 22 has to download the whole program from the external memory 23 to the internal memory 21. Therefore, the capacity of the internal memory 21 has to be the same as that of the external memory 23. For example, the micro-controller with a 16-bit address bus may directly correspond to the memories ranging from 0000H to FFFFH, which are 64K bytes in total. Thus, if the external memory 23 has 64K bytes, the internal memory 21 may also have 64K bytes. Therefore, the micro-control system 20 needs not to provide a lot of pads, but the larger internal memory is needed. Because the internal memory usually needs the higher access speed, the static memory (SRAM) with the higher cost and the larger capacity still cannot satisfy the low-cost requirement.

Thus, if the cache technology is combined with the serial data reading, the pad cost and the internal static memory requirement of the micro-control system may be reduced. FIG. 3 shows a micro-control system 30 having the cache technology combined with the serial data reading. The micro-control system 30 includes a micro-controller 11, an internal cache memory 32, a cache controller 31 and a serial interface read controller 22. The micro-control system 30 is connected to an external memory 23. The cache controller 31 typically includes L rows of address tags for recording address blocks stored in the internal cache memory 32. Furthermore, each row of address tags includes M bits of block tags and represents the address block of T-byte data. For example, the cache controller 31 includes eight rows of address tags, wherein each said row of address tags includes 8 bits of block tags and represents the address block of 256-byte data.

When the micro-control system 30 starts to operate, the cache controller 31 compares the data of micro-controller read-out address outputted form the micro-controller 11 with the data stored in the block tags of the eight rows of address tags to judge whether the reading data has been stored in the internal cache memory 32. When the cache controller 31 makes sure that the data of the micro-controller read-out address has been stored in the internal cache memory 32 (the condition of hit), the cache controller 31 directly transfers the data from the internal cache memory 32 to the micro-controller 11. When the cache controller 31 makes sure that the data of the micro-controller read-out address is not stored in the internal cache memory 32 (the condition of miss), the serial interface read controller 22 downloads the 256-byte data (program code) from the external memory 23 to the internal cache memory 32. Thereafter, the cache controller 31 transfers the data needed to the micro-controller 11.

In the typical cache control method, the L rows of address tags are used to record the high-bit (MSB) address corresponding to the address of the internal cache memory. FIG. 4 shows the architecture of address tag rows in a conventional cache controller. For example, each row of address tags records 8 bits of high-bit address data, and the corresponding data quantity is 256 bytes. Therefore, if eight rows of address tags are used, the internal cache memory needs to have about 2048 bytes. However, when the data is not stored in the internal cache memory 32, 256 bytes of data have to be downloaded from the external memory 23 to the internal cache memory 32 at each time. Because the micro-controller 11 operates in a waiting state during the data downloading period, the performance or efficiency of the micro-control system 30 is influenced when the data quantity downloaded is too large. In addition, not all the data in the internal cache memory 32 will be read and utilize well. Therefore, it is desirable to provide an improved cache control method to mitigate and/or obviate aforementioned problems.

SUMMARY OF THE INVENTION

In view of the above-mentioned problems, it is therefore an object of the invention to provide a serial interface cache controller, a control method and a micro-controller system using the cache controller, wherein the data quantity downloaded at each time is reduced according to a N-bits valid area tag so that the performance of the micro-controller system is enhanced and the serial interface bandwidth of the cache memory is reduced.

To achieve the above-identified object, the invention provides a serial interface cache controller applied to a micro-controller system that reads data from an external memory through a serial interface read controller, then stores the data to an internal cache memory, and controls a micro-controller to read the data from the internal cache memory, wherein a micro-controller read-out address outputted from the micro-controller has A bits, and the serial interface cache controller comprises:

an address tag row register for storing L rows of address tags, wherein each of the rows of address tags comprises an M-bits block tag for recording an address block of T-bytes data stored in the internal cache memory, and an N-bits valid area tag for recording valid bit sectors in the address block, M is an integer smaller than A, and each of the valid bit sectors has a size of T/N bytes;

a comparison control unit for reading the L rows of address tags in the address tag row register and the micro-controller read-out address of the micro-controller, comparing data of the M-bits block tags with [A−1,M] bit data of the micro-controller read-out address, comparing data of the N-bits valid area tags with [M−1,K] bit data of the micro-controller read-out address, and outputting a comparison signal, an internal cache memory read-out address and an external memory read-out address, wherein N is 2 to the $K^{th}$ power; and a finite state machine for controlling the micro-controller to read the data from the internal cache memory according to the internal cache memory read-out address, and reading the data from the external memory to the internal cache memory according to the external memory read-out address, wherein when the [A−1,M] bit data of the micro-controller read-out address is not matched any data in the M-bits block tags, or when the [A−1,M] bit data of the micro-controller read-out address is matched the data of the M-bits block tag in one of the address tag but the data of the N-bits valid area tag in the address tag does not have the [M−1,K] bit data of the micro-controller read-out address, the comparison control unit reads the data from the external memory to the internal cache memory by the external memory read out address, wherein the data read from the external memory at each time is smaller than T bytes;

wherein when the [A−1,M] bit data of the micro-controller read-out address is not matched any data in the M-bits block tags, the comparison control unit updates the [A−1,M] bit data of the micro-controller read-out address into the M-bits block tag of one of the L rows of address tags.

In addition, the invention provides a serial interface cache control method applied in a micro-controller system that reads data from an external memory through a serial interface read controller, then stores the data to an internal cache memory, and controls a micro-controller to read the internal cache memory, wherein a micro-controller read-out address outputted from the micro-controller has A bits, and the serial interface cache control method comprises:

comparing data of M-bits block tags of L rows of address tags with [A−1,M] bit data of the micro-controller read-out address, and outputting first comparison data with a flag bit and a plurality of indication bits, wherein when one of the data of the M-bits block tag is matched the [A−1,M] bit data of the micro-controller read-out address, the flag bit of the first comparison data is enabled and the indication bits is set to the row number of the matched block tag;

detecting [M−1,K] bit data of the micro-controller read-out address corresponding to N-bits valid area tags of the row of address tags according to the indication bits, and outputting second comparison data, wherein when the flag bit is enabled and the [M−1,K] bit data of the read-out address corresponding to the N-bits valid area tag of the L rows of address tags is valid, the second comparison data is enabled;

updating the [A−1,M] bit data of the micro-controller read-out address to one of the M-bits block tag when the flag bit of the first comparison data is not enabled;

a data downloading step, in which the micro-controller system reads the data from the external cache memory and stores the data into the internal cache memory, sets the N-bits valid area tag of the row of address tags to be valid, and enables the second comparison data when the flag bit of the first comparison data is not enabled or the second comparison data is not enabled; and a data reading step, in which the micro-controller system reads the data from the internal cache memory when the second comparison data is enabled.

In the serial interface cache controller and the serial interface cache control method of the invention, a valid area tag is provided to the address tag row of the internal cache memory such that the internal cache memory may further be divided into several memory blocks. When the data of the micro-controller read-out address is not stored in the internal cache memory, the serial interface cache controller may read the data from the external memory respectively through the serial interface with respect to the memory block. It is unnecessary to read all the data corresponding to one address tag row at one time. Thus, the data reading quantity can be effectively reduced, the required transmission bandwidth of the serial interface may be reduced, and the performance of the overall micro-control system may be enhanced.

BRIEF DESCRIPTION OF THE DRAWINGS

The present invention will become more fully understood from the detailed description given hereinbelow and the accompanying drawings which are given by way of illustration only, and thus are not limitative of the present invention.

FIG. 4 shows the architecture of address tag rows in a conventional cache controller.

FIG. 5 shows the architecture of address tag rows in a cache controller of the invention.

DETAILED DESCRIPTION OF THE INVENTION

Figure 1:
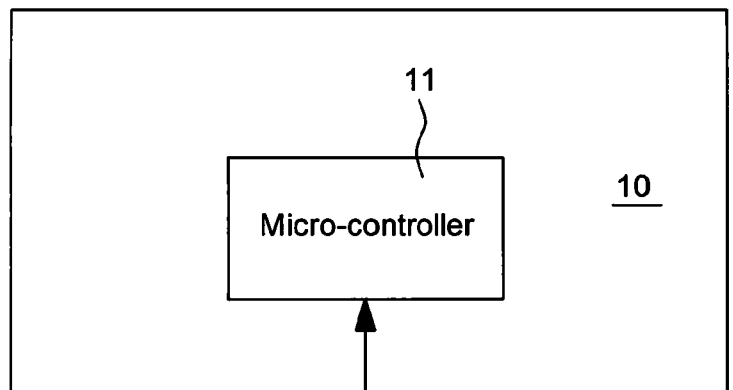
FIG. 1 shows the architecture of a typical micro-control system 10 for accessing data from an external memory in parallel.
Figure 2:
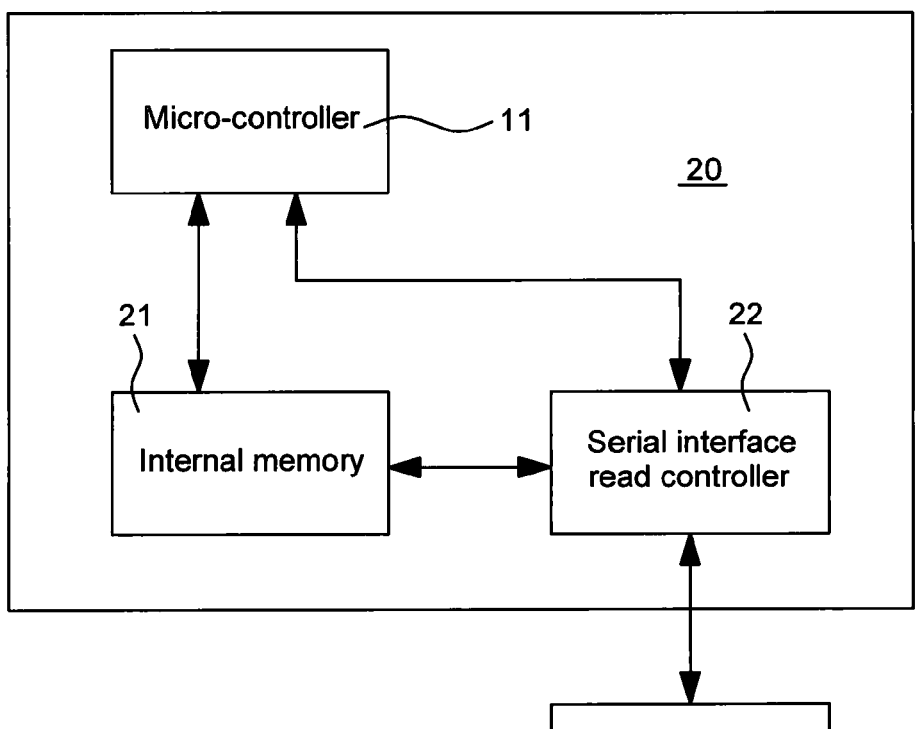
FIG. 2 shows the architecture of a typical micro-control system for serially accessing data from an external memory.
Figure 3:
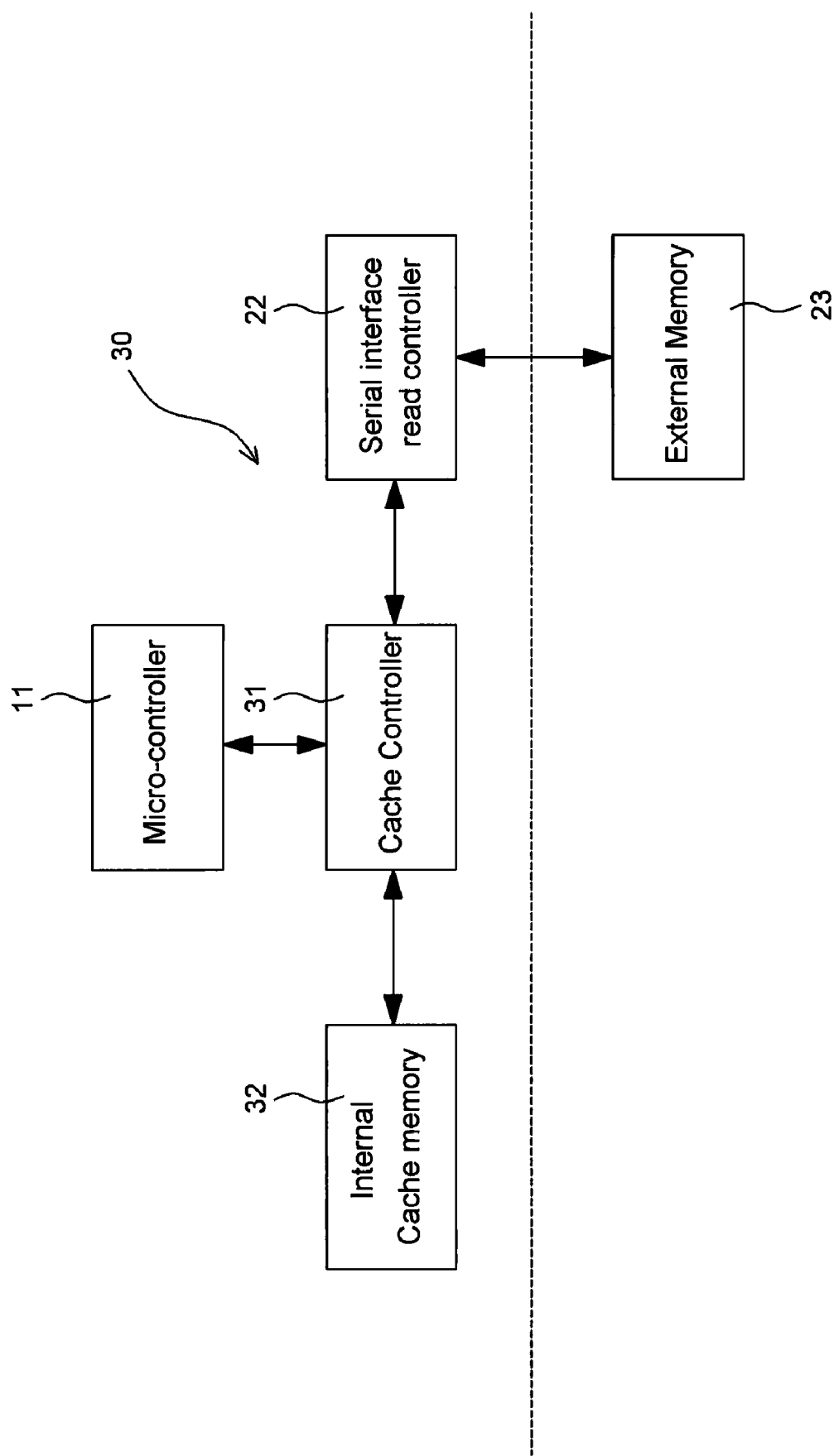
FIG. 3 shows a conventional micro-control system with the cache technology combined with serial data reading.

The present invention will be apparent from the following detailed description, which proceeds with reference to the accompanying drawings, wherein the same references relate to the same elements.

The serial interface cache controller, the control method and the micro-controller system using the controller according to the invention will be described with reference to the accompanying drawings.

For a typical cache controller, its address tag rows are only used to record the M most significant bits of addresses, such as 8 bits of addresses. Thus, the data quantity corresponding to each address tag row is 256 bytes. When M is increased, although the data quantity corresponding to each address tag row is decreased, the address tag rows have to be increased correspondingly for storing same data amounts. The complexity and cost of the cache controller are correspondingly increased when the number of address tag rows gets larger. For example, if M is 8, and the cache controller has eight address tag rows, then an internal cache memory of 2048 bytes is needed, and the data quantity downloaded from an external memory at each time is equal to 256 bytes. When M is 10, 32 address tag rows are needed on condition that the capacity of the internal cache memory is kept 2048 bytes, and the data quantity downloaded from the external memory at each time is reduced to 64 bytes. However, the loading to the cache controller with 32 address tags rows is heavy. In the prior art, when the address of the required data is not in the internal cache memory, the conventional cache controller replaces one row of address tags with the address of the required data, and reads data from the external memory and stores the data into the internal cache memory. In the architecture of the address tag row having the value M equal to 8, when the address of the required data is not in the internal cache memory, 256 bytes of data quantity have to be replaced at one time. The same condition occurs when the data of several tens of bits is required by the micro-controller. Therefore, the performance of the micro controller is poor.

Figures 4, 5:
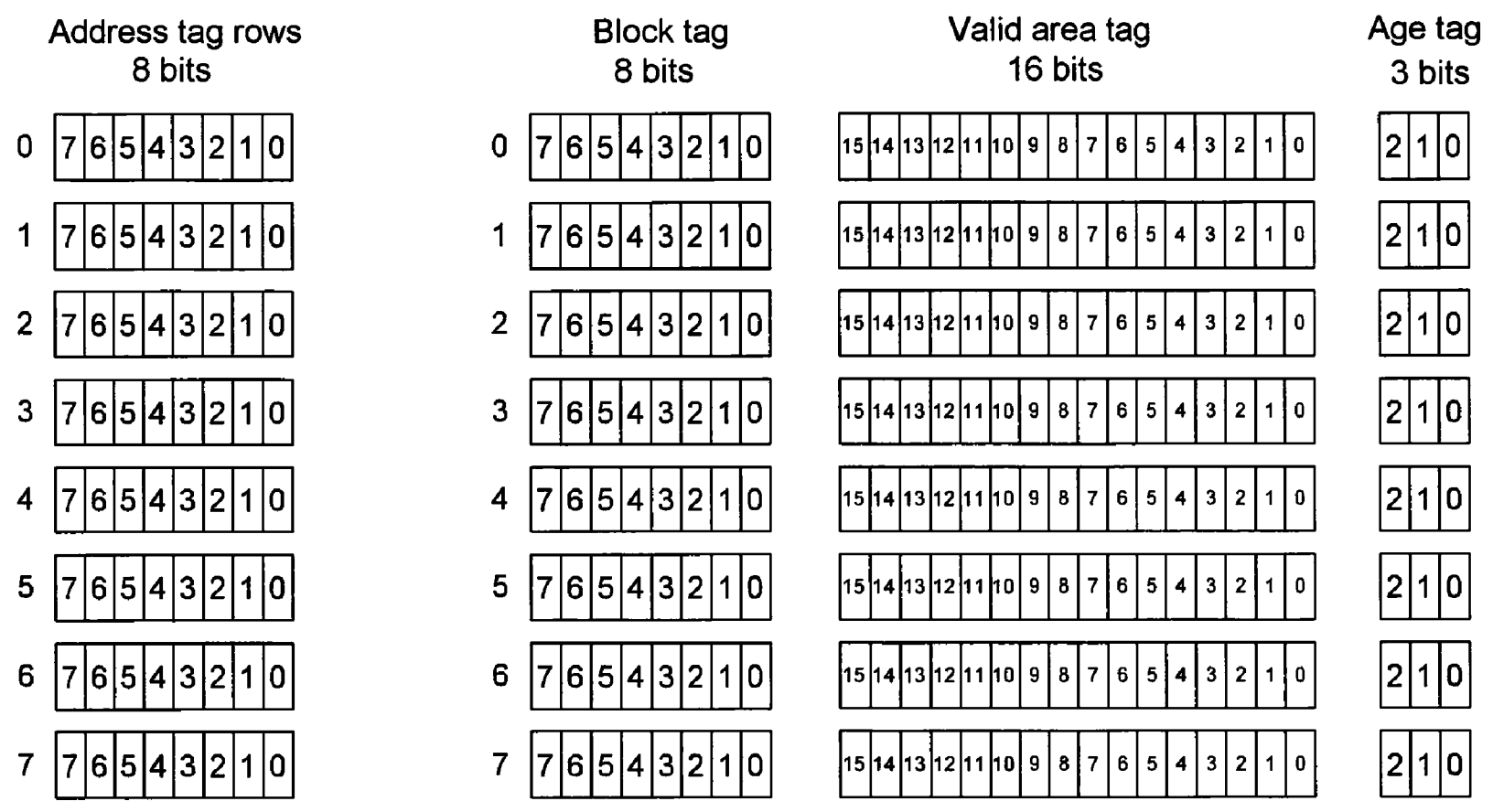

Therefore, the invention provides a new cache controller architecture, wherein the address tag rows are not only used to record the M most significant bits of addresses, but also to record K secondary significant bits of addresses. FIG. 5 shows the architecture of address tag rows in the cache controller of the invention. The example, in which M is 8 and K is 4, will be illustrated in the following. As shown in this drawing, each address tag row of the cache controller according to an embodiment of the invention is divided into three portions, which are respectively M-bits block tag, N-bits valid area tag and P-bits age tag. The M-bits block tag is used for recording the M most significant bits of addresses from the micro-controller read-out addresses. The N-bits valid area tag is used for recording valid states corresponding to the K secondary significant bits of addresses. Each bit of the valid area tag represents whether the data corresponding to its address is stored in the internal cache memory. The P-bits age tag represents the used frequency of the address tag row. In this embodiment, P is 3, and N is 16 owing to N is 2 to the $K^{th}$ power.

Each address tag row represents a cache area in the memory. When the M-bits block tag contains eight most significant bits, each address tag row corresponds to the cache area with 256 bytes. When the address tag row is then assigned with 16 bits of valid area tags again, the cache area with 256 bytes can be finely divided into 16 cache sectors, wherein each cache sector contains 16 bytes. In practice, the sixteen cache sectors can be independently accessed. The N-bits valid area tags with 16 bits represent whether the 16 cache sectors have the valid data.

When the M-bits block tag of one address tag row is F0H, it represents the partial data or whole data of F000H to F0FFH are stored in the internal cache memory. When the N-bits valid area tag of the corresponding address tag row is 0110110001101111B, it represents that the data corresponding to the addresses F000H to F00FH, F010H to F01FH, F020H to F02FH, F030H to F03FH, F050H to F05FH, F060H to F06FH, F0A0H to F0AFH, F0B0H to F0BFH, F0D0H to F0DFH, and F0E0H to F0EFH have been stored in the internal cache memory.

Thus, when the cache controller 31 receives the micro-controller read-out address from the micro-controller 11, it firstly compares the high eight bit [15:8] data of the micro-controller read-out address with the M-bits block tags of all the address tag rows. When the M-bits block tag of one row of address tags is the same as the high eight bit [15:8] data of the micro-controller read-out address, it represents that the micro-controller read-out address falls in the internal cache memory 32. At this time, the cache controller 31 again compares the N-bits valid area tag of the corresponding address tag row with the secondary high four bit [7:4] data of the micro-controller read-out address. When the bit of the N-bits valid area tag corresponding to the secondary high four bit [7:4] data of the micro-controller read-out address is one, it represents that the data required by the micro-controller 11 is stored in the internal cache memory 32. Then, the cache controller 31 informs the micro-controller 11 that the data in the internal cache memory 32 can be read.

When the bit of the N-bits valid area tag corresponding to the secondary high 4 bit [7:4] data of the micro-controller read-out address is 0, it represents that the data required by the micro-controller 11 is not stored in the internal cache memory 32. At this time, the cache controller 31 informs the micro-controller 11 to wait, and the serial interface read controller 22 reads 16 bytes of data from the external memory 23 into the internal cache memory 32. Then, the cache controller 31 sets the bit corresponding to the N-bits valid area tag of the corresponding address tag row to as 1, and informs the micro-controller 11 to start executing.

When there is no any data in the M-bits block tags as the same as the high eight bit [15:8] data of the micro-controller read-out address, the cache controller 31 informs the micro-controller 11 to wait, and selects one row of address tags to sacrifice as the high eight bit [15:8] data of the micro-controller read-out address and clears the N-bits valid area tag of the corresponding address tag row as 0. Thereafter, the serial interface read controller 22 reads 16 bytes of data from the external memory 23 to the internal cache memory 32 corresponding to the updated address tag rows. After the download operation is finished, the cache controller 31 sets the bit corresponding to the N-bits valid area tag of the address tag row as 1 and informs the micro-controller 11 to start executing.

Regarding to the issue about which row of address tags will be replaced, the processing method may be performed according to, for example, the P-bits age tag of the address tag row. Because the P-bits age tag is increased or decreased when each memory area corresponding to the address tag row is re-written, the minimum (or maximum) age tag represents that the address tag row is most seldom used according to the design setting. The serial interface read controller 22 precedentially replaces the most seldom used address tag row.

Figure 6:
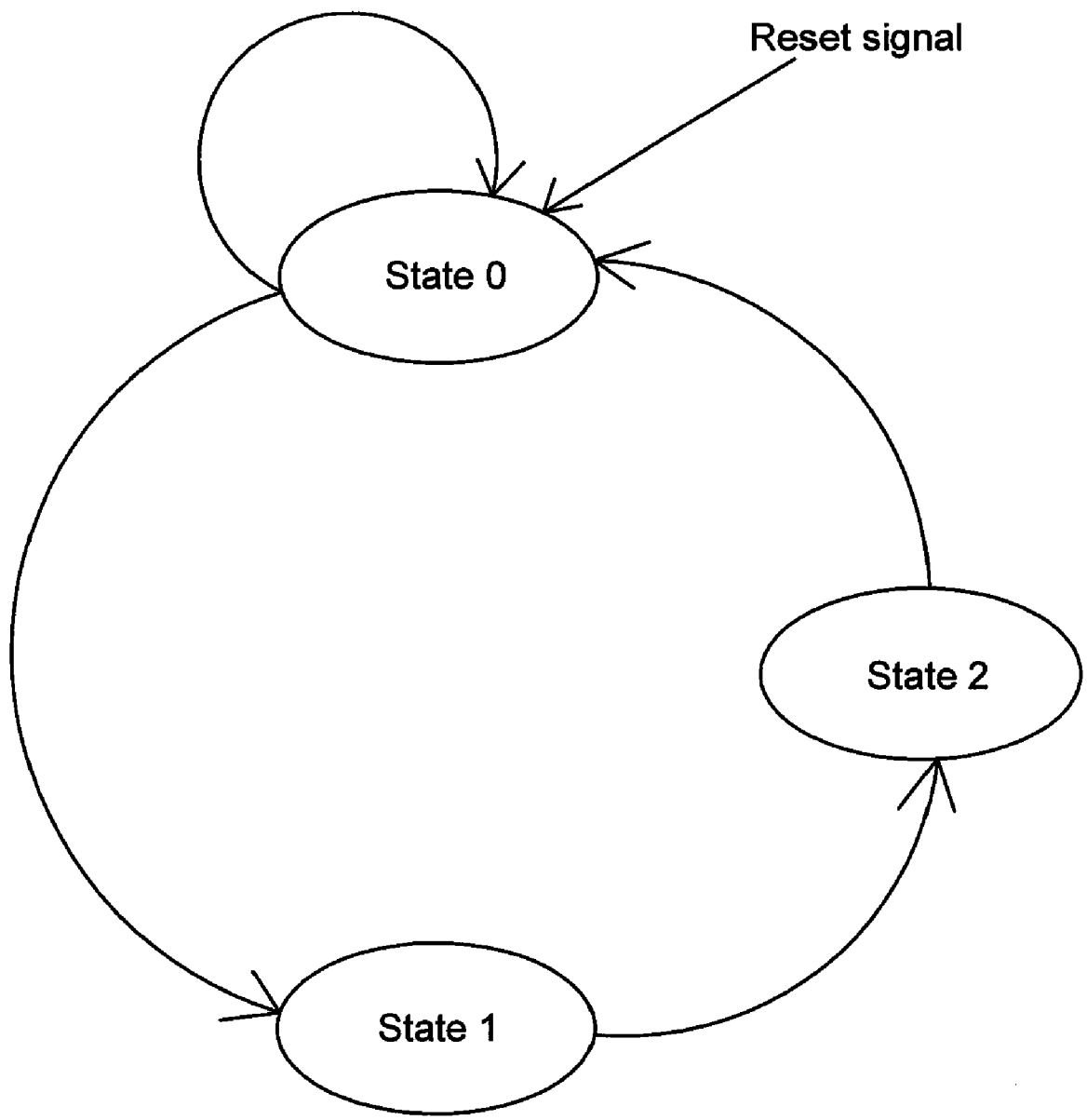
FIG. 6 shows the state of a finite state machine used in the cache controller of the invention.

FIG. 6 shows the state of a finite state machine used in the cache controller of the invention. As shown in FIG. 6, the state machine has three states, including an initial state as state 0, a tag row update determining state as state 1, and a data download state as state 2. After the system boosts or resets, the finite state machine is in the initial state. For example, when the cache controller 31 receives the enabled reset signal, the state machine returns to the initial state. Next, once the cache controller 31 receives the reading request of the micro-controller 11, the cache controller 31 determines whether the address to be read by the micro-controller 11 exists in the internal cache memory 32. When the data to be read by the micro-controller 11 is stored in the internal cache memory 32, the finite state machine returns to the initial state. At this time, the micro-controller 11 reads the data from the internal cache memory 32. When the data to be read by the micro-controller 11 does not exist in the internal cache memory 32, the cache controller 31 jumps to the tag row update determining state. At this time, the cache controller 31 finds the to-be-updated address tag row according to the predetermined rule, and updates the data in the address tag row. Next, the cache controller 31 jumps to the data download state. The cache controller 31 reads 16 bytes of data from the external memory 23, and stores the data into the corresponding internal cache memory 32. Finally, the cache controller 31 returns to the initial state, and informs the micro-controller 11 to read the data from the internal cache memory 32.

Figure 7:
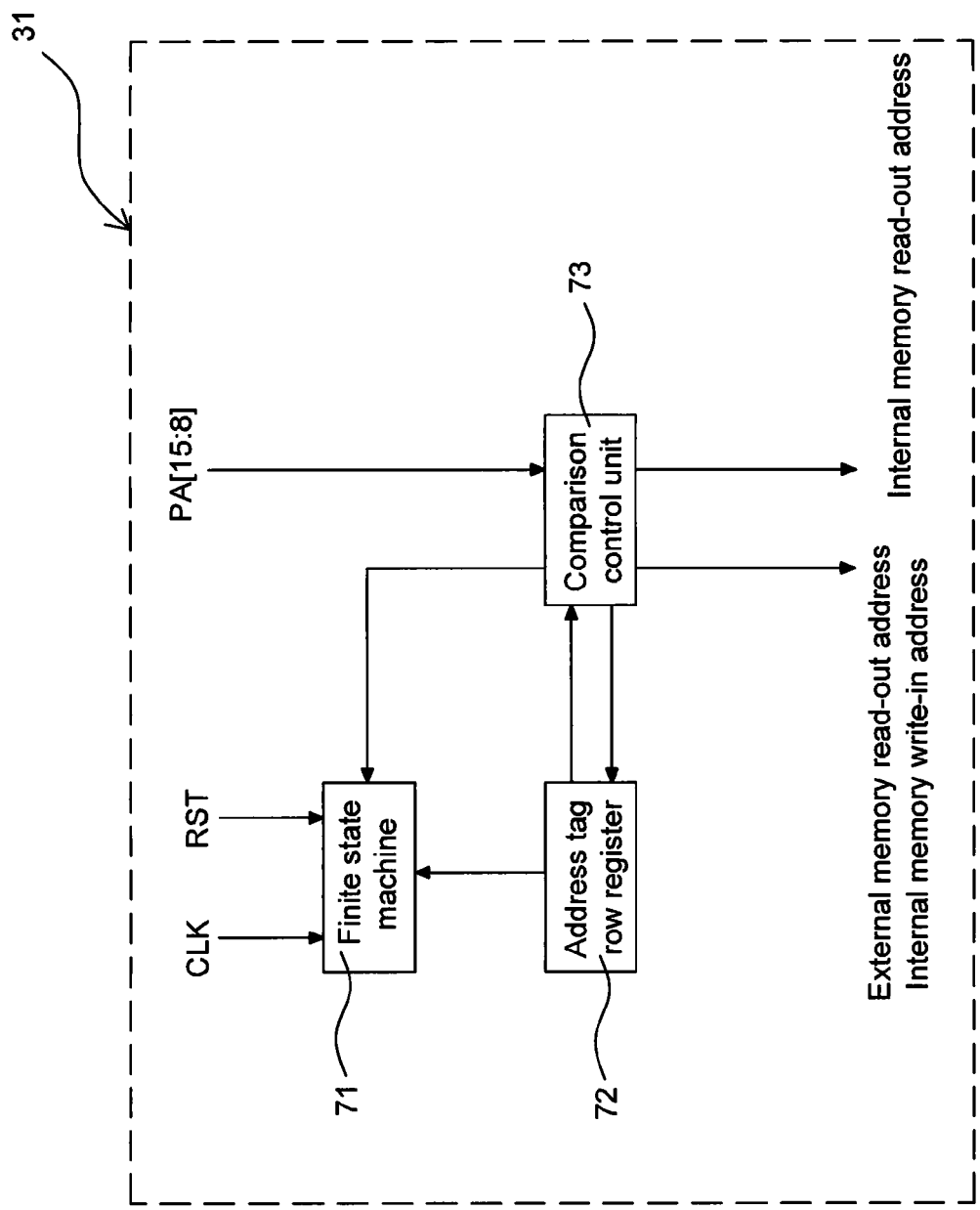
FIG. 7 is a block diagram showing a cache controller according to an embodiment of the invention.

FIG. 7 is a block diagram showing the cache controller 31 according to an embodiment of the invention. The operation of the address bus will be described with reference to FIG. 7. The cache controller 31 includes a finite state machine 71, an address tag row register 72 and a comparison control unit 73. As shown in FIG. 6, the finite state machine 71 has three states, which are respectively the initial state, the tag row update determining state and the data download state. The address tag row register 72 stores L rows of address tags, and each row of address tags is divided into three portions, which are respectively an M-bits block tag, an N-bits valid area tag and a P-bits age tag. The comparison control unit 73 receives the micro-controller read-out address and the data of the address tag row register 72, then outputs a comparison result to the finite state machine 71 while outputting an internal cache memory access address and an external memory read-out address. Meanwhile, when there is no any data in the M-bits block tags as the same as the high eight bit [15:8] data of the micro-controller read-out address, the comparison control unit 73 updates one row of address tags as the high 8 bit [15:8] data of the micro-controller read-out address, and clears the N-bits valid area tag of the corresponding address tag row to be 0. Furthermore, when the corresponding bit of the N-bits valid area tag as 0, the comparison control unit 73 reads 16 bytes of data from the external memory 23, and stores the data into the corresponding internal cache memory 32.

Figure 8:
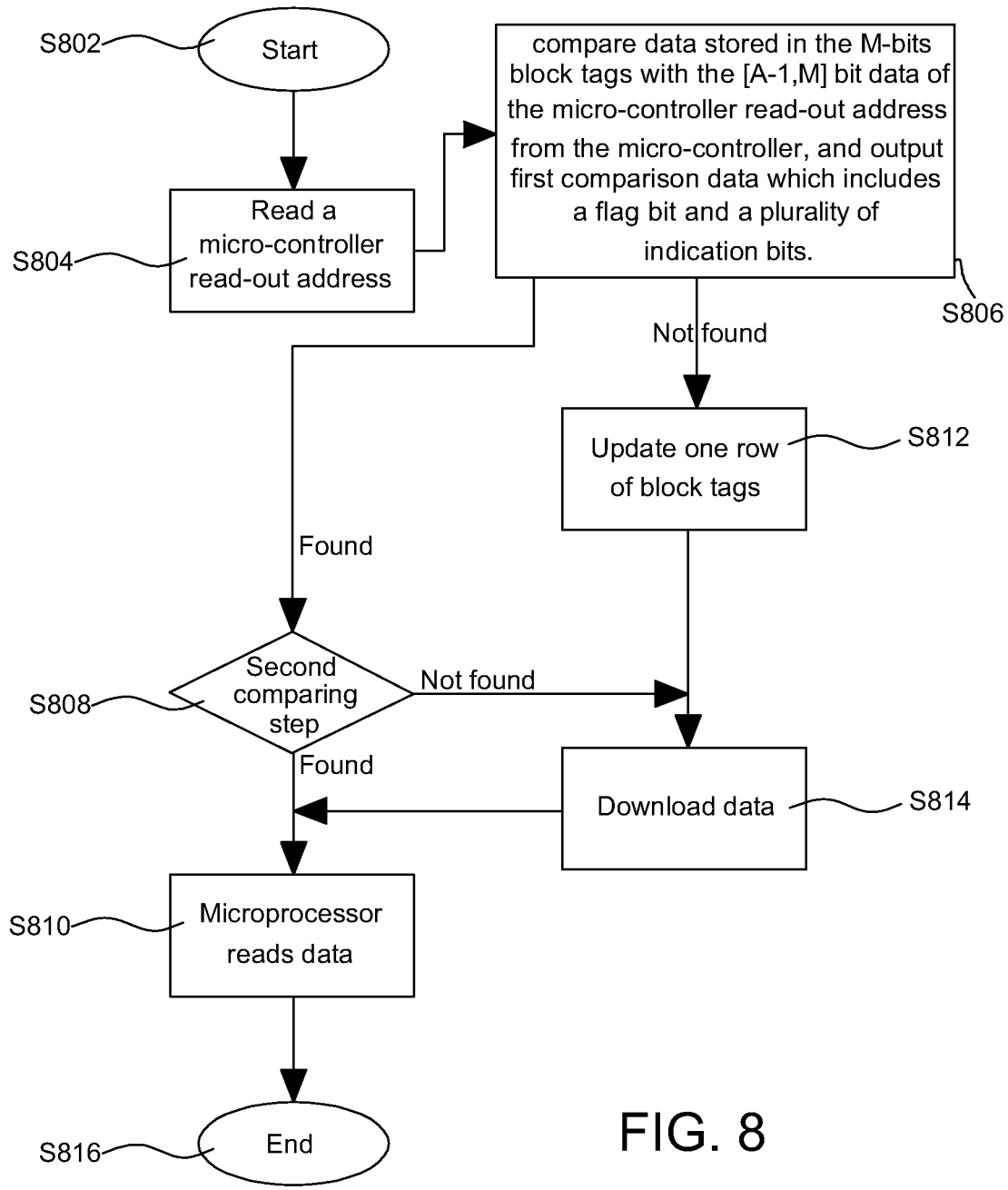
FIG. 8 is a flow chart showing a serial interface cache control method of the invention.

FIG. 8 is a flow chart showing a serial interface cache control method of the invention. The serial interface cache control method is used in a micro-controller system. The micro-controller system reads data from an external memory through a serial interface read controller and then stores the data into an internal cache memory, and controls a micro-controller to read the data of the internal cache memory. The read-out address of the micro-controller from the micro-controller is A bits.

In a first comparing step (S806), data stored in the M-bits block tags are compared with the [A−1,M] bit data of the micro-controller read-out address from the micro-controller, and first comparison data is outputted. The first comparison data includes a flag bit and a plurality of indication bits. When the data stored in one of the M-bits block tags is the same as the [A−1,M] bit data of the micro-controller read-out address, the flag bit of the first comparison data is enabled and the indication bits are the matched address tag row.

In a second comparing step (S808), when the flag bit of the first comparison data is enabled, it is detected whether the [M−1,K] bit data of the micro-controller read-out address corresponding to the N-bits valid area tag of the row of updated address tag is valid, and second comparison data is outputted. When the detection result is valid, the second comparison data is enabled. The updated address tag is indicated by the indication bits.

In a block tag updating step (S812), when the flag bit of the first comparison data is not enabled, the [A−1,M] bit data of the micro-controller read-out address is updated into one of the M-bits block tags.

In a data downloading step (S814), when the flag bit of the first comparison data is not enabled or the second comparison data is not enabled, the micro-controller system reads the data from the external cache memory, stores the data into the internal cache memory, sets the bit corresponding to the N-bits valid area tag to be valid, and enables the second comparison data.

In a data reading step (S810), when the second comparison data is enabled, the micro-controller system reads the data from the internal cache memory.

In the serial interface cache controller and the serial interface cache control method of the invention, the N-bits valid area tag is used to record the valid cache sector. Thus, when the serial interface cache controller downloads the data from the external memory into the internal cache memory at each time, only a little data quantity is downloaded. For example, only 1/N times of the data quantity in the cache controller is needed. The serial interface cache controller of the invention can effectively reduce the downloaded data and thus enhance the performance of the serial interface cache controller of the invention.

While the invention has been described by way of examples and in terms of preferred embodiments, it is to be understood that the invention is not limited thereto. To the contrary, it is intended to cover various modifications. Therefore, the scope of the appended claims should be accorded the broadest interpretation so as to encompass all such modifications.

What is claimed is:

1. A serial interface cache controller, applied to a micro-controller system that reads data from an external memory through a serial interface read controller, then stores the data into an internal cache memory, and controls a micro-controller to read the internal cache memory, wherein a micro-controller read-out address of the micro-controller is A bits, the serial interface cache controller comprising:

an address tag row register, for storing L rows of address tags, wherein each of the rows of address tags comprises an M-bits block tag for recording an address block of T-bytes data stored in the internal cache memory, and an N-bits valid area tag for recording valid bit sectors in the address block, M is an integer smaller than A, and each of the valid bit sectors has a size of T/N bytes;

a comparison control unit, for reading the L rows of address tags in the address tag row register and the micro-controller read-out address of the micro-controller, comparing data of the M-bits block tags with [A−1,M] bit data of the micro-controller read-out address, comparing data of the N-bits valid area tags with [M−1,K] bit data of the micro-controller read-out address, and outputting a comparison signal, an internal cache memory read-out address and an external memory read-out address, wherein N is 2 to the $K^{th}$ power, wherein N-bits valid area tag includes P bits; and a finite state machine, for controlling the micro-controller to read the data from the internal cache memory according to the internal cache memory read-out address, and reading the data from the external memory to the internal cache memory according to the external memory read-out address, wherein when the [A−1,M] bit data of the micro-controller read-out address does not match any data in the M-bits block tags, or when the [A−1,M] bit data of the micro-controller read-out address matches the data of the M-bits block tag in one of the address tag but the data of the N-bits valid area tag in the address tag does not have the [M−1,K] bit data of the micro-controller read-out address, the comparison control unit reads the data from the external memory to the internal cache memory by the external memory read out address, wherein the data read from the external memory at each time is smaller than T bytes;

wherein, when $J^{th}$ bit of N-bits valid area tag is a first logic, a data of the $J^{th}$ sector exists in the internal cache memory, and when the $C^{th}$ bit of N-bits valid area tag is a second logic, a data of the $C^{th}$ sectors does not exist in the internal cache memory, wherein 0<=J, C<P, wherein, when the [A−1,M] bit data of the micro-controller read-out address matches one of data in the M-bits block tags of one of the L rows of address tags, the $Q^{th}$ bit of N-bits valid area tag is the first logic and the address

[M−1,K] is equal to Q, the serial interface cache controller capture a data of the $Q^{th}$ sector to the micro-controller, and wherein when the [A−1,M] bit data of the micro-controller read-out address does not match any data in the M-bits block tags, the comparison control unit updates the [A−1,M] bit data of the micro-controller read-out address into the M-bits block tag of one of the L rows of address tags.

2. The serial interface cache controller according to claim 1, wherein the data read through the external memory by the comparison control unit is T/N bytes at each time.

3. The serial interface cache controller according to claim 1, wherein A is 16, M is 8, L is 8, N is 16, K is 4, and T is 256.

4. The serial interface cache controller according to claim 3, wherein the data read through the external memory by the comparison control unit is 16 bytes at each time.

5. The serial interface cache controller according to claim 1, wherein each of the rows of address tags further comprises a P-bits age tag.

6. The serial interface cache controller according to claim 5, wherein when the [A−1,M] bit data of the micro-controller read-out address matches the data among the M-bits block tags, the comparison control unit increases a value of the P-bits age tag in the row of address tags.

7. The serial interface cache controller according to claim 6, wherein when the [A−1, M] bit data of the micro-controller read-out address of the micro-controller does not match any data among the M-bits block tags, the comparison control unit updates the row of address tags with a minimum age tag value, and sets the P-bits age tag in the row of address tags as 0.

8. A serial interface cache control method, applied in a micro-controller system that reads data from an external memory through a serial interface read controller, stores the data into an internal cache memory, and controls a micro-controller to read the internal cache memory, wherein a micro-controller read-out address of the micro-controller has A bits, the serial interface cache control method comprising:

comparing data of M-bits block tags of L rows of address tags with [A−1,M] bit data of the micro-controller read-out address, and outputting first comparison data with a flag bit and a plurality of indication bits, wherein when one of the data of the M-bits block tag matches the [A−1,M] bit data of the micro-controller read-out address, the flag bit of the first comparison data is enabled and the indication bits is set to the row number of the matched block tag, wherein N-bits valid area tag includes P bits;

detecting [M−1,K] bit data of the micro-controller read-out address corresponding to N-bits valid area tags of the row of address tags according to the indication bits, and outputting second comparison data, wherein when the flag bit is enabled and the [M−1,K] bit data of the read-out address corresponding to the N-bits valid area tag of the L rows of address tags is valid, the second comparison data is enabled, wherein, and when $J^{th}$ bit of N-bits valid area tag is a first logic, a data of the $J^{th}$ sector exists in the internal cache memory, when the $C^{th}$ bit of N-bits valid area tag is a second logic, a data of the $C^{th}$ sectors does not exist in the internal cache memory, wherein 0<=J, C<P;

capturing a data of the $Q^{th}$ sector to the micro-controller when the [A−1,M] bit data of the micro-controller read-out address matches one of data in the M-bits block tags of one of the L rows of address tags and the $Q^{th}$ bit of N-bits valid area tag the first logic and the address [M−1, K] is equal to Q;

updating the [A−1,M] bit data of the micro-controller read-out address to one of the M-bits block tag when the flag bit of the first comparison data is not enabled;

a data downloading step, in which the micro-controller system reads the data from the external cache memory and stores the data into the internal cache memory, sets the N-bits valid area tag of the row of address tags to be valid, and enables the second comparison data when the flag bit of the first comparison data is not enabled or the second comparison data is not enabled; and a data reading step, in which the micro-controller system reads the data from the internal cache memory when the second comparison data is enabled.

9. The method according to claim 8, wherein the data read from the external memory in the data downloading step is T/N bytes at each time.

10. The method according to claim 8, wherein A is 16, M is 8, L is 8, N is 16, K is 4, and T is 256.

11. The method according to claim 10, wherein the data read from the external memory in the data downloading step is 16 bytes at each time.

12. A micro-controller system, for utilizing a serial interface cache controller to read data from an external memory, storing the data into an internal cache memory, and controlling a micro-controller to read the internal cache memory, wherein a micro-controller read-out address of the micro-controller has A bits, the serial interface cache controller comprising:

an address tag row register, for storing L rows of address tags, wherein each of the rows of address tags comprises an M-bits block tag for recording an address block of T-bytes data stored in the internal cache memory, and an N-bits valid area tag for recording valid bit sectors in the address block, M is a positive integer smaller than A, and each of the valid bit sectors has a size of T/N bytes;

a comparison control unit, for reading the data from the L rows of address tags and the micro-controller read-out address, comparing data of the M-bits block tags with [A−1,M] bit data of the micro-controller read-out address, comparing data of the N-bits valid area tags with [M−1,K] bit data of the micro-controller read-out address, and outputting a comparison signal, an internal cache memory read-out address and an external memory read-out address, wherein N is 2 to the $K^{th}$ power, wherein N-bits valid area tag includes P bits; and a finite state machine, for receiving the comparison signal, controlling the micro-controller to read the internal cache memory according to the internal cache memory read-out address, and to read the data from the external memory to the internal cache memory according to the external memory read-out address;

wherein, when $J^{th}$ bit of N-bits valid area tag is a first logic, a data of the $J^{th}$ sector exists in the internal cache memory, and when the $C^{th}$ bit of N-bits valid area tag is a second logic, a data of the $C^{th}$ sectors does not exist in the internal cache memory, wherein 0<=J, C<P, wherein, when the [A−1,M] bit data of the micro-controller read-out address matches one of data in the M-bits block tags of one of the L rows of address tags, the $Q^{th}$ bit of N-bits valid area tag is the first logic and the address [M−1,K] is equal to Q, the serial interface cache controller capture a data of the $Q^{th}$ sector to the micro-controller, wherein when the [A−1,M] bit data of the micro-controller read-out address does not match any data in the M-bits block tags, or when the [A−1,M] bit data of the micro-controller read-out address matches one of data in the M-bits block tags but the data of the N-bits valid area tag in the corresponding address tag does not correspond to the [M−1,K] bit data of the read-out address, the comparison control unit utilizes the external memory read-out address to read the data from the external memory to the internal cache memory, wherein the data read from the external memory at each time is smaller than T bytes; and when the [A−1,M] bit data of the micro-controller read-out address does not match any data in the M-bits block tags, the comparison control unit updates the [A−1,M] bit data in the micro-controller read-out address to one of the M-bits block tag.

13. The micro-controller system according to claim 12, wherein the data read from the external memory by the comparison control unit is T/N bytes at each time.

14. The micro-controller system according to claim 12, wherein A is 16, M is 8, L is 8, N is 16, K is 4, and T is 256.

15. The micro-controller system according to claim 14, wherein the data read from the external memory by the comparison control unit is 16 bytes at each time.

* * * * *